United States Patent
Aoki (10) Patent No.: US 10,562,516 B2
(45) Date of Patent: Feb. 18, 2020

(54) HYBRID VEHICLE AND METHOD OF CONTROLLING THE SAME

(71) Applicant: TOYOTA JIDOSHA KABUSHIKI KAISHA, Toyota-shi, Aichi-ken (JP)

(72) Inventor: Kazuma Aoki, Nisshin (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 63 days.

(21) Appl. No.: 15/828,675

(22) Filed: Dec. 1, 2017

(65) Prior Publication Data
US 2018/0170350 A1 Jun. 21, 2018

(30) Foreign Application Priority Data
Dec. 21, 2016 (JP) .................... 2016-248152

(51) Int. Cl.
*B60W 20/13* (2016.01)
*B60W 20/40* (2016.01)
(Continued)

(52) U.S. Cl.
CPC ............ *B60W 20/13* (2016.01); *B60W 10/06* (2013.01); *B60W 10/08* (2013.01); *B60W 20/40* (2013.01);
(Continued)

(58) Field of Classification Search
CPC . B60K 2006/268; B60W 10/06; B60W 10/08; B60W 10/10; B60W 10/26; B60W 20/00; B60W 20/10; B60W 20/11; B60W 20/13; B60W 20/16; B60W 20/20; B60W 20/40; B60W 30/182; B60W 30/184; B60W 30/188; B60W 30/192; B60W 50/082; B60W 50/087; B60W 50/12; B60W 2050/0002; B60W 2050/0066; B60W 2510/083; B60W 2510/088;
(Continued)

(56) References Cited

U.S. PATENT DOCUMENTS

| | | | |
|---|---|---|---|
| 9,469,292 B2* | 10/2016 | Hisano | B60W 50/085 |
| 9,493,150 B2* | 11/2016 | Endo | B60K 6/46 |
| 10,065,629 B2* | 9/2018 | Teraya | B60K 6/445 |
| 2010/0145560 A1* | 6/2010 | Komatsu | B60K 6/365 |
| | | | 701/22 |

(Continued)

FOREIGN PATENT DOCUMENTS

| | | |
|---|---|---|
| JP | 2013-154715 | 8/2013 |
| JP | 2013-252853 | 12/2013 |

(Continued)

*Primary Examiner* — Thomas G Black
*Assistant Examiner* — Ce Li Li
(74) *Attorney, Agent, or Firm* — Finnegan, Henderson, Farabow, Garrett & Dunner, LLP (57) ABSTRACT

A hybrid vehicle is configured such that one of a CD mode and a CS mode can be selectively set as a traveling mode. The hybrid vehicle includes: a power generation apparatus; an electricity storage device; and an electronic control unit configured to control the power generation apparatus such that start-up of an engine is restricted to a larger extent when a driver switches the traveling mode from the CD mode to the CS mode while a SOC of the electricity storage device is higher than an upper limit of a control center value in the CS mode, than when the driver switches the traveling mode from the CD mode to the CS mode while the SOC is equal to or lower than the upper limit.

8 Claims, 6 Drawing Sheets

(51) Int. Cl.
  *B60W 10/08*  (2006.01)
  *B60W 10/06*  (2006.01)
  *B60W 50/08*  (2012.01)
(52) U.S. Cl.
  CPC ..... *B60W 50/082* (2013.01); *B60W 2510/244* (2013.01); *B60W 2540/04* (2013.01); *B60W 2710/244* (2013.01)
(58) Field of Classification Search
  CPC ..... B60W 2510/242; B60W 2510/244; B60W 2520/30; B60W 2530/12; B60W 2540/04; B60W 2540/10; B60W 2540/103; B60W 2710/083; B60W 2710/1005; B60W 2710/105; B60W 2710/1061; B60W 2710/244; B60Y 2200/92; B60Y 2300/476; Y02T 10/6239; Y02T 10/6286; Y02T 10/7011; Y02T 10/7077; Y10S 903/93
  See application file for complete search history.

(56) References Cited

U.S. PATENT DOCUMENTS

| | | | | |
|---|---|---|---|---|
| 2013/0073136 | A1* | 3/2013 | Yamamoto | B60K 6/445 701/22 |
| 2014/0358347 | A1* | 12/2014 | Endo | B60K 6/445 701/22 |
| 2015/0127203 | A1* | 5/2015 | Kashiba | B60W 10/24 701/22 |
| 2015/0217755 | A1* | 8/2015 | Bryan | B60W 10/26 701/22 |
| 2015/0307083 | A1* | 10/2015 | Hisano | B60W 50/085 701/22 |
| 2016/0368483 | A1* | 12/2016 | Nawata | B60W 10/06 |

FOREIGN PATENT DOCUMENTS

| | | |
|---|---|---|
| JP | 2015-140065 A | 8/2015 |
| JP | 2016-88128 | 5/2016 |
| WO | WO2013/088563 A1 | 6/2013 |

\* cited by examiner

HYBRID VEHICLE AND METHOD OF CONTROLLING THE SAME

INCORPORATION BY REFERENCE

The disclosure of Japanese Patent Application No. 2016-248152 filed on Dec. 21, 2016 including the specification, drawings and abstract is incorporated herein by reference in its entirety.

BACKGROUND

1. Technical Field

The disclosure relates to a hybrid vehicle including a power generation apparatus that includes an electric motor and an engine provided with an exhaust gas catalyst, and an electricity storage device configured to supply electricity to the electric motor or to be supplied with electricity from the electric motor, and the disclosure relates also to a method of controlling the hybrid vehicle.

2. Description of Related Art

Examples of this kind of hybrid vehicle include a hybrid vehicle in which either a charge-depleting (CD) mode or a charge-sustaining (CS) mode can be set as a traveling mode of the hybrid vehicle (see, for example, Japanese Unexamined Patent Application Publication No. 2013-252853 (JP 2013-252853 A)). When the traveling mode of the hybrid vehicle is the CD mode, a higher priority is given to electric vehicle (EV) traveling in which only an electric motor is used as a power source to promote consumption of electricity stored in an electricity storage device, while hybrid vehicle (UV) traveling accompanied by an operation of an engine is also permitted. On the other hand, when the traveling mode of the hybrid vehicle is the CS mode, switching between HV traveling and EV traveling is performed as needed, to maintain the state-of-charge (SOC) of the electricity storage device within a prescribed range.

Examples of this kind of hybrid vehicle further include a hybrid vehicle provided with a switch for performing switching from an EV (CD) mode where the hybrid vehicle travels using only an electric motor as a power source without using an engine as a power source, to an HV (CS) mode where the hybrid vehicle travels using both the engine and the electric motor as power sources (see, for example, Japanese Unexamined Patent Application Publication 2013-154715 (JP 2013-154715 A)). While the hybrid vehicle is traveling in the HV mode after a driver manually switches the traveling mode from the EV mode to the HV mode, an SOC control center value, which is a control target value of the SOC of an electricity storage device, is set to a value higher than the SOC of the electricity storage device at the time when the hybrid vehicle is traveling in the EV mode immediately before the traveling mode is switched to the HV mode. Thus, the SOC of the electricity storage device at the time when the driver manually switches the traveling mode from the EV mode to the HV mode can be maintained while the hybrid vehicle is traveling in the HV mode after the traveling mode is switched to the HV mode. JP 2013-154715 A further describes that, while the hybrid vehicle is traveling in the HV mode after the driver manually switches the traveling mode from the EV mode to the HV mode, the SOC of the electricity storage device at the time when the traveling mode is switched from the EV mode to the HV mode, is set as the SOC control center value.

SUMMARY

It is desirable to set, in advance, an upper limit (and a lower limit) of the SOC control center value, which is a control target value of the SOC, from the viewpoint of protection of the electricity storage device and relaxation of the prohibition of regenerative braking. However, in a hybrid vehicle configured to permit a driver to switch the traveling mode from the CD mode to the CS mode, when the SOC is higher than the upper limit of the SOC control center value, the traveling mode may be switched from the CD mode to the CS mode by a driver who attempts to maintain the SOC at a high level. In such a case, if the SOC at the time when the traveling mode is switched from the CD mode to the CS mode or a value higher than this SOC is set as the SOC control center value, the efficiency may be reduced due to prohibition of regenerative braking. When the traveling mode is switched from the CD mode to the CS mode by a driver, engine start-up occurs with a higher frequency than that while the traveling mode is the CD mode. Thus, it is also necessary to suppress increases in the emission.

The disclosure makes the control of a hybrid vehicle at the time when a driver switches a traveling mode from a charge-depleting to a charge-sustaining, as effective as possible.

A first aspect of the disclosure relates to a hybrid vehicle configured such that one of a charge-depleting (CD) mode and a charge-sustaining (CS) mode is selectively set as a traveling mode. The hybrid vehicle includes: a power generation apparatus including an engine provided with an exhaust gas catalyst, and an electric motor configured to generate electricity with the use of at least part of power from the engine; an electricity storage device configured to supply electricity to the electric motor or to be supplied with electricity from the electric motor; a mode switching unit configured to permit a driver to perform switching between the CD mode and the CS mode; and an electronic control unit. The electronic control unit is configured to: control the power generation apparatus such that a state of charge (SOC) of the electricity storage device approaches a control center value that is equal to or lower than an upper limit set in advance, while the traveling mode is the CS mode; and control the power generation apparatus such that start-up of the engine is restricted to a larger extent when the driver switches the traveling mode from the CD mode to the CS mode while the SOC is higher than the upper limit of the control center value, than when the driver switches the traveling mode from the CD mode to the CS mode while the SOC is equal to or lower than the upper limit of the control center value.

In the hybrid vehicle, when the driver switches the traveling mode from the CD mode to the CS mode while the SOC of the electricity storage device is higher than the upper limit of the control center value, start-up of the engine is restricted to a larger extent than when the driver switches the traveling mode from the CD mode to the CS mode while the SOC is equal to or lower than the upper limit. Thus, even when the traveling mode is switched from the CD mode to the CS mode by the driver while the SOC of the electricity storage device is higher than the upper limit of the control center value, it is possible to promote consumption of the electricity in the electricity storage device to lower the SOC, thereby protecting the electricity storage device and relaxing prohibition of regenerative braking. Further, restriction of start-up of the engine prolongs the interval of start-up of the engine. Thus, it is possible to suppress the engine from being started-up when the exhaust gas cleaning performance has been lowered due to a temperature drop of the exhaust gas catalyst. Consequently, the control of the hybrid vehicle at the time when the driver switches the traveling mode from the CD mode to the CS mode can be made as effective as possible.

In the above aspect, the electronic control unit may be configured to restrict start-up of the engine from when the driver switches the traveling mode to the CS mode until when the SOC becomes equal to or lower than the upper limit of the control center value. Thus, even after the SOC becomes equal to or lower than the upper limit of the control center value, it is possible to respond to the driver's needs to maintain the SOC of the electricity storage device at a high level by switching the traveling mode to the CS mode.

In the above aspect, the electronic control unit may be configured to determine whether or not to start up the engine based on a start-up condition of the engine in the CD mode, when the driver switches the traveling mode from the CD mode to the CS mode while the SOC is higher than the upper limit of the control center value. Thus, when the driver switches the traveling mode from the CD mode to the CS mode while the SOC is higher than the upper limit of the control center value, it is possible to restrict start-up of the engine more appropriately. Further, it is possible to suppress an increase in the design cost due to setting of a start determination condition dedicated to such switching of the traveling mode.

The hybrid vehicle may further include a traveling mode display unit configured to display the traveling mode that is one of the CD mode and the CS mode. The electronic control unit may be configured to display the CD mode on the traveling mode display unit in response to switching of the traveling mode from the CD mode to the CS mode performed by the driver while the SOC is higher than the upper limit of the control center value. Thus, even if a start determination on the engine is made based on the start-up condition of the engine in the CD mode despite the fact that the driver has selected the CS mode, the driver is less likely to feel uncomfortable.

In the above aspect, the electronic control unit may be configured to: change a power output characteristic of the power generation apparatus depending on whether the traveling mode is the CD mode or the CS mode; and change the power output characteristic of the power generation apparatus to a power output characteristic in the CS mode, when the driver switches the traveling mode from the CL) mode to the CS mode while the SOC is higher than the upper limit of the control center value. Thus, even if a start determination on the engine is made based on the start-up condition of the engine in the CD mode despite the fact that the driver has selected the CS mode, the driver is less likely to feel uncomfortable.

In the above aspect, the electronic control unit may be configured to prohibit start-up of the engine at least based on a required traveling power required of the power generation apparatus, in response to switching of the traveling mode from the CD mode to the CS mode performed by the driver while the SOC is higher than the upper limit of the control center value. Thus, it is possible to significantly appropriately suppress the engine from being started-up when the exhaust gas cleaning performance has been lowered due to a temperature drop of the exhaust gas catalyst.

In the above aspect, the electricity storage device may be configured to be charged with electricity from an external power source, it is needless to say that the electricity storage device may be an electricity storage device that cannot be charged with electricity from an external power source.

A second aspect of the disclosure relates to a method of controlling a hybrid vehicle configured such that one of a CD mode and a CS mode is selectively set as a traveling mode. The hybrid vehicle includes: a power generation apparatus including an engine provided with an exhaust gas catalyst, and an electric motor configured to generate electricity with use of at least part of power from the engine; and an electricity storage device configured to supply electricity to the electric motor or to be supplied with electricity from the electric motor. The hybrid vehicle is configured such that a driver is permitted to perform switching between the CD mode and the CS mode. The method includes restricting start-up of the engine to a larger extent when the driver switches the traveling mode from the CD mode to the CS mode while a SOC of the electricity storage device is higher than an upper limit of a control center value of the SOC in the CS mode, than when the driver switches the traveling mode from the CD mode to the CS mode while the SOC is equal to or lower than the upper limit of the control center value.

With this method, the control of the hybrid vehicle at the time when the driver switches the traveling mode from the CD mode to the CS mode can be made as effective as possible.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
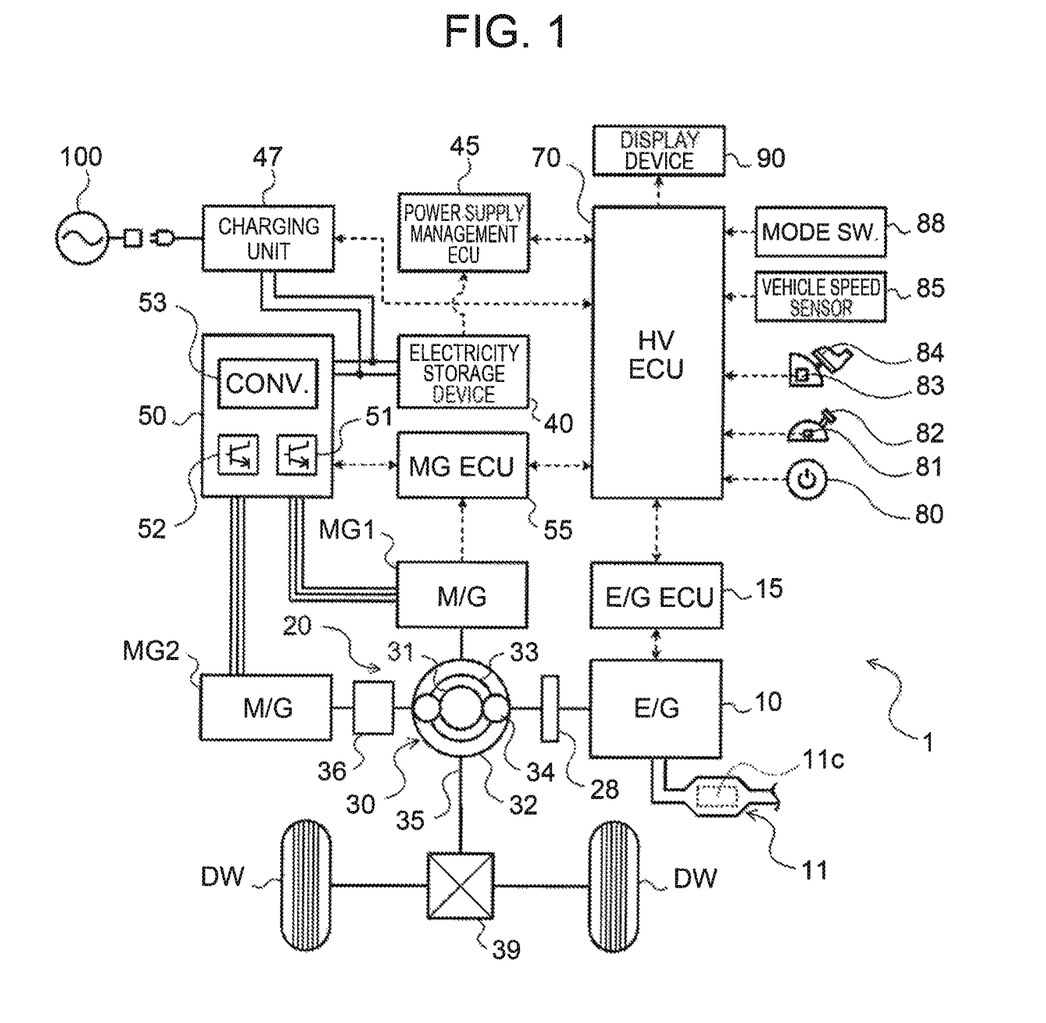
FIG. 1 is a diagram schematically illustrating the configuration of a hybrid vehicle according to the disclosure.

Hereinafter, example embodiments of the disclosure will be described with reference to the accompanying drawings. FIG. 1 is a diagram schematically illustrating the configuration of a hybrid vehicle 1 according to the disclosure.

The hybrid vehicle 1 illustrated in FIG. 1 includes an engine 10, a planetary gear mechanism 30 of a single pinion type, motor generators MG1, MG2 each of which is a synchronous generator-motor, an electricity storage device 40, an electricity controller (hereinafter, referred to as "PCU") 50 connected to the electricity storage device 40 and configured to drive the motor generators MG1, MG2, and a hybrid electronic control unit (hereinafter, referred to as "HVECU") 70 configured to control the entirety of the hybrid vehicle 1. In the hybrid vehicle 1, the engine 10, the planetary gear mechanism 30, and the motor generators MG1, MG2 constitute a power generation apparatus 20 of a hybrid type.

The engine 10 is an internal combustion engine in which an air-fuel mixture of air and hydrocarbon fuel, such as gasoline, diesel oil, or liquefied petroleum gas (LPG), is burned, whereby power is generated. The engine 10 is controlled by an engine electronic control unit (hereinafter, referred to as "engine ECU") 15 including a microcomputer that includes a central processing unit (CPU) and so forth (not illustrated). As illustrated in FIG. 1, the engine 10 is provided with an exhaust gas control apparatus 11 connected to an exhaust pipe. The exhaust gas control apparatus 11 includes an exhaust gas catalyst (three-way catalyst) 11c of a NOx storage-type, which is configured to remove pollutants, such as carbon monoxide (CO), HC, and NOx, contained in the exhaust gas flowing from a combustion chamber of the engine 10 into the exhaust gas control apparatus 11 via the exhaust pipe.

The planetary gear mechanism 30 includes a sun gear 31 connected to a rotor of the motor generator MG1, a ring gear 32 connected to a drive shaft 35 and coupled to a rotor of the motor generator MG2 via a speed reducer 36, and a planetary carrier 34 by which a plurality of pinion gears 33 is rotatably supported. The planetary carrier 34 is coupled to a crankshaft (output shaft) of the engine 10 via a damper 28. The drive shaft 35 is coupled to right and left wheels (drive wheels) DW via a gear mechanism (not illustrated) and a differential gear 39. Note that the speed reducer 36 may be replaced with a stepped transmission configured to select the speed ratio between the rotational speed of the rotor of the motor generator MG2 and the rotational speed of the drive shaft 35, from a plurality of speed ratios.

The motor generator MG1 serves mainly as an electricity generator that generates electricity with the use of at least part of the power from the engine 10 operated under load conditions. The motor generator MG2 serves mainly as an electric motor that generates power by being driven with at least one of electricity from the electricity storage device 40 and electricity from the motor generator MG1. The motor generator MG2 outputs regenerative braking torque at the time of braking of the hybrid vehicle 1. The motor generators MG1, MG2 are configured to supply electricity to the electricity storage device 40 via the PCU 50 or to be supplied with electricity from the electricity storage device 40 via the PCU 50.

The electricity storage device 40 is one of a lithium-ion secondary battery and a nickel-hydride secondary battery, each having a rated output voltage of, for example, 200 V to 300 V. The electricity storage device 40 is managed by a power supply management electronic control unit (hereinafter, referred to as "power supply management ECU") 45 including a microcomputer that includes a CPU and so forth (not illustrated). The power supply management ECU 45 calculates, for example, a state-of-charge (SOC), a permissible charging electricity Win, and a permissible discharging electricity Wout of the electricity storage device 40, based on a voltage VB across terminals from a voltage sensor of the electricity storage device 40, a charging-discharging current IB from an electric current sensor of the electricity storage device 40, a battery temperature Tb from a temperature sensor of the electricity storage device 40 and so forth. The electricity storage device 40 may be a capacitor or may include both a secondary battery and a capacitor.

The hybrid vehicle 1 according to the present embodiment is a plug-in hybrid vehicle configured such that the electricity storage device 40 can be charged with electricity from an external power source 100, such as a household power source. The hybrid vehicle 1 includes a charging unit 47 connected to electric lines that connect the electricity storage device 40 and the PCU 50 to each other. The charging unit 47 includes, for example, an AC-DC converter that converts alternating-current (AC) power from the external power source 100, which is supplied via a power supply plug, into direct-current (DC) power, and a DC-DC converter that adjusts the voltage of the DC power from the AC-DC converter and supplies the DC power with an adjusted voltage to the electricity storage device 40 (both are not illustrated). In the present embodiment, the charging unit 47 is controlled by the HVECU 70.

The PCU 50 includes, for example, a first inverter 51 that drives the motor generator MG1, a second inverter 52 that drives the motor generator MG2, and a boost converter (voltage conversion module) 53 configured to boost the voltage of electricity from the electricity storage device 40 and lower the voltage of electricity from the motor generators MG1, MG2-side. The PCU 50 is controlled by a motor electronic control unit (hereinafter, referred to as a "MGECU") 55 including a microcomputer that includes a CPU and so forth (not illustrated). The MGECU 55 receives a command signal from the HVECU 70, and signals indicating a voltage before boosting by the boost converter 53, a voltage after boosting by the boost converter 53, detected values obtained by resolvers (not illustrated) that detect rotational positions of the rotors of the motor generators MG1, MG2, phase currents applied to the motor generators MG1, MG2 and so forth. Based on these input signals, the MGECU 55 executes switching control on the first and second inverters 51, 52 and the boost converter 53. The MGECU 55 also calculates rotational speeds Nm1, Nm2 of the rotors of the motor generators MG1, MG2 based on the detected values obtained by the resolvers.

The HVECU 70 includes a microcomputer that includes, for example, a CPU, a read-only memory (ROM), a random-access memory (RAM), and an input-output device (not illustrated). The HVECU 70 exchanges various kinds of signals with, for example, the engine ECU 15, the power supply management ECU 45, and MGECU 55 through a network (CAN). The HVECU 70 also receives a signal from a start switch (ignition switch) 80 configured to issue an instruction to activate a system of the hybrid vehicle 1, and signals indicating a shift position SP of a shift lever 82, which is detected by a shift position sensor 81, an accelerator depression amount Acc indicating a depression amount of an accelerator pedal 84, which is detected by an accelerator pedal position sensor 83, a vehicle speed V detected by a vehicle speed sensor 85, the rotational speeds Nm1, Nm2 of the motor generators MG1, MG2 from the MGECU 55 and so forth.

When the hybrid vehicle 1 is traveling, the HVECU 70 sets a required torque (required braking torque) Tr* that should be output from the power generation apparatus 20 to the drive shaft 35, based on the accelerator depression amount Acc and the vehicle speed V, and also sets a required traveling power Pd* required for traveling of the hybrid vehicle 1, based on the required torque Tr* and a rotational speed Nr of the drive shaft 35. Further, the HVECU 70 determines whether or not to operate the engine 10 under load conditions, based on the required torque Tr*, the required traveling power Pd*, a target charging-discharging electricity Pb* of the electricity storage device 40, the permissible discharging electricity Wout of the electricity storage device 40 and so forth. When the HVECU 70 determines that the engine 10 is to be operated under load conditions, the HVECU 70 sets a target power Pe* of the engine 10 such that the engine 10 is operated efficiently, based on the required power P*, the target charging-discharging electricity Pb* and so forth, and also sets a target engine speed Ne* of the engine 10 corresponding to the target power Pe*. Further, the HVECU 70 sets torque commands Tm1*, Tm2* for the motor generators MG1, MG2 such that the torque commands Tm1*, Tm2* correspond to the required torque Tr*, the target engine speed Ne* and so forth. On the other hand, when the HVECU 70 determines that the operation of the engine 10 is to be stopped, the HVECU 70 sets each of the target power Pe*, the target engine speed Ne*, and the torque command Tm1* to a value of zero, and also sets the torque command Tm2* such that a torque corresponding to the required torque Tr* is output from the motor generator MG2 to the drive shaft 35.

Then, the HVECU 70 transmits the target power Pe* and the target engine speed Ne* to the engine ECU 15, and transmits the torque commands Tm1*, Tm2* to the MGECU 55. The engine ECU 15 executes intake air amount control, fuel injection control, ignition timing control and so forth, based on the target power Pe* and the target engine speed Ne*. The MGECU 55 executes switching control on the first and second inverters 51, 52 and the boost converter 53 based on the torque commands Tm1*, Tm2*. While the engine 10 is operated under load conditions, the motor generators MG1, MG2 are controlled to carry out torque conversion on part of (at the time of charging) or the entirety of (at the time of discharging) the power output from the engine 10, in cooperation with the planetary gear mechanism 30, and to output the power, which has undergone the torque conversion, to the drive shaft 35. Thus, the hybrid vehicle 1 travels (HV traveling) using the power (directly transmitted torque) from the engine 10 and the power from the motor generator MG2. On the other hand, while the operation of the engine 10 is stopped, the hybrid vehicle 1 travels (EV traveling) using the power from the motor generator MG2.

Further, the HVECU 70 sets one of a CD mode and a CS mode as a traveling mode of the hybrid vehicle 1, based on the SOC of the electricity storage device 40. In the CD mode, consumption of the electricity accumulated in the electricity storage device 40 is promoted by giving a higher priority to EV traveling in which the operation of the engine 10 is stopped, than to HV traveling in which the engine 10 is operated. In the CS mode, a higher priority is given to HV traveling than to EV traveling. As described above, in the plug-in hybrid vehicle 1 including the electricity storage device 40 that can be charged with electricity from the external power source 100, the traveling mode can be set to one of the CD mode and the CS mode. Thus, it is possible to increase the opportunities to carry out EV traveling, thereby further improving the fuel efficiency.

Specifically, when the SOC of the electricity storage device 40 has exceeded a first threshold Sref1 set in advance (for example, a value of about 45% to 55%) at the time of system activation (for example, immediately after the electricity storage device 40 is charged with electricity from the external power source 100), the HVECU 70 sets the value of a traveling mode flag Fm to one, thereby setting the traveling mode to the CD mode. Further, while the traveling mode is the CD mode, the HVECU 70 sets a start determination power Pdref, which is a threshold to be compared with the required traveling power Pd* in a start determination on the engine 10, to a significantly large value (for example, infinite). When the required traveling power Pd* is smaller than the start determination power Pdref, the HVECU 70 maintains the engine 10 in a stopped state. Thus, while the traveling mode is set to the CD mode, it is possible to substantially prohibit the operation of the engine 10 and give a higher priority to EV traveling than to HV traveling. Even while the traveling mode is the CD mode, when the power that should be output from the motor generator MG2 exceeds the permissible discharging electricity Wout of the electricity storage device 40 or when the torque that should be output from the motor generator MG2 exceeds the rated torque of the motor generator MG2, the engine 10 is started up, so that the torque from the engine 10 is output to the drive shaft 35.

When the SOC of the electricity storage device 40 becomes equal to or lower than a second threshold Sref2 (for example, a value of about 25% to 35%) that is lower than the first threshold Sref1 while the hybrid vehicle 1 is traveling in the CD mode, the HVECU 70 sets the value of the traveling mode flag Fm to zero, thereby switching the traveling mode from the CD mode to the CS mode. Further, based on the SOC at the time when the traveling mode is switched from the CD mode to the CS mode, the HVECU 70 sets a control center value Scc, which is a target value of the SOC, within a range from a lower limit S0 set in advance (for example, 20%) to an upper limit S1 (for example, 80%) (Scc=max(S0, min(S1, SOC at the time of switching))). Then, while the CS mode is set as the traveling mode, the engine 10 and the motor generators MG1, MG2 are controlled, that is, the power generation apparatus 20 is controlled, such that the SOC of the electricity storage device 40 falls within the prescribed range centered on the control center value Scc (such that the SOC approaches the control center value Scc).

Figure 2:
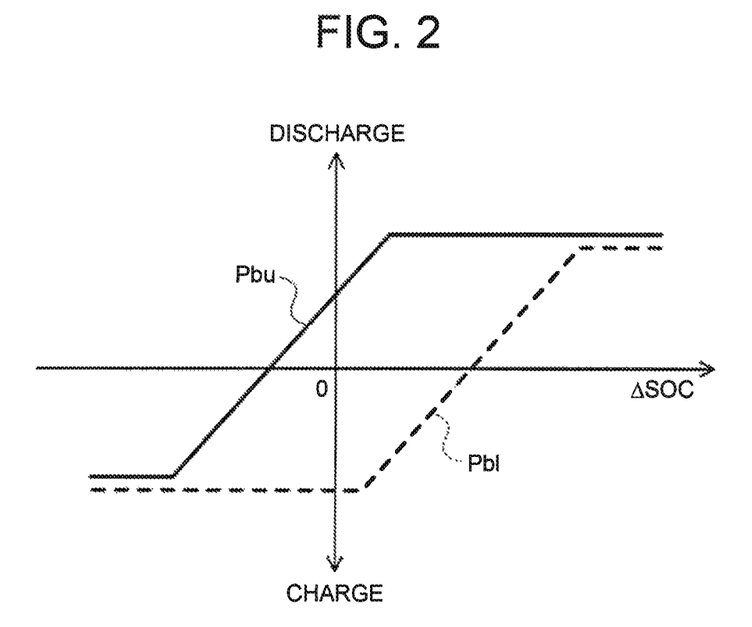
FIG. 2 is an explanatory diagram illustrating an example of a map used to set an upper limit and a lower limit of the target charging-discharging electricity of an electricity storage device in the hybrid vehicle in FIG. 1.

While the traveling mode is the CS mode, the HVECU 70 sets an upper limit charging-discharging electricity Pbu and a lower limit charging-discharging electricity Pbl of the charging-discharging electricity of the electricity storage device 40 based on the SOC, with reference to a map illustrated as an example in FIG. 2, and also sets the target charging-discharging electricity Pb*, which enables the engine 10 to operate efficiently, within a range between the upper limit charging-discharging electricity Pbu and the lower limit charging-discharging electricity Pbl. The map illustrated in FIG. 2 is created in advance so as to define the relationship between a difference ΔSOC between the SOC of the electricity storage device 40 and the control center value Scc (=SOC−Scc) and the upper and lower limits Pbu, Pbl, and is stored in a ROM (not illustrated) of the HVECU 70.

As indicated by a solid line in FIG. 2, the upper limit charging-discharging electricity Pbu is set, for example, in the following manner: when the difference ΔSOC is equal to or smaller than a first value (a negative value having a relatively large absolute value), the upper limit charging-discharging electricity Pbu is set to a relatively small negative constant value; when the difference ΔSOC is within a range between the first value and a second value (a relatively small positive value) larger than the first value, the upper limit charging-discharging electricity Pbu is set to increase as the ΔSOC increases; and when the difference ΔSOC is equal to or larger than the second value, the upper limit charging-discharging electricity Pbu is set to a relatively large positive constant value. Further, as indicated by a broken line in FIG. 2, the lower limit charging-discharging electricity Pbl is set, for example, in the following manner: when the difference ΔSOC is equal to or smaller than a third value (a positive value larger than the first value), the lower limit charging-discharging electricity Pbl is set to a relatively small negative constant value (for example, the same value as the negative constant value described above); when the difference ΔSOC is within a range between the third value and a fourth value (a positive value larger than the second value and the third value), the lower limit charging-discharging electricity Pbl is set to increase as ΔSOC increases; and when the difference ΔSOC is equal to or larger than the fourth value, the lower limit charging-discharging electricity Pbl is set to a relatively large positive constant value (for example, the same value as the positive constant value described above). Thus, while the traveling mode is the CS mode, the target charging-discharging electricity Pb* is increased toward the discharging-side as the difference ΔSOC increases (as the SOC becomes higher than the control center value Scc by a larger amount), whereas the target charging-discharging electricity Pb* is increased toward the charging-side as the difference ΔSOC decreases (as the SOC becomes lower than the control center value Scc by a larger amount).

Figure 3:
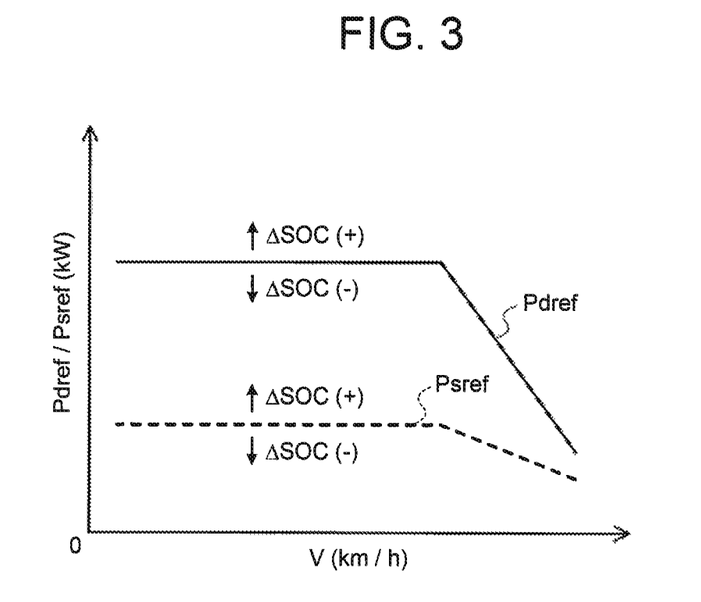
FIG. 3 is an explanatory diagram illustrating an example of each of a start determination power setting map and a stop determination power setting map used in the hybrid vehicle in FIG. 1.

Further, while the traveling mode is set to the CS mode, the HVECU 70 sets a start determination power Pdref, which is used in a start determination on the engine 10, from a start determination power setting map indicated by a solid line in FIG. 3, and sets a stop determination power Psref, which is used in a stop determination on the engine 10, from a stop determination power setting map indicated by a broken line in FIG. 3. The start determination power setting map and the stop determination power setting map are created in advance so as to define the relationship between the vehicle speed V and the difference ΔSOC, and the start determination power Pdref or the stop determination power Psref, and is stored in a ROM (not illustrated) of the HVECU 70.

The start determination power setting map illustrated in FIG. 3 is created such that, when the difference ΔSOC is constant, the start determination power Pdref is maintained at a constant value until the vehicle speed V reaches a relatively high prescribed vehicle speed, and after the vehicle speed V reaches the prescribed vehicle speed, the start determination power Pdref decreases as the vehicle speed V increases. Further, the start determination power setting map is created such that, as the difference ΔSOC increases, that is, as the SOC becomes higher than the control center value Scc by a larger amount, the start determination power Pdref increases, and as the difference ΔSOC decreases, that is, as the SOC becomes lower than the control center value Scc by a larger amount, the start determination power Pdref decreases. In addition, the stop determination power setting map illustrated in FIG. 3 is created such that the stop determination power Psref is smaller than the start determination power Pdref corresponding to the same vehicle speed, and the stop determination power Psref is changed in the same manner as that of a change in the start determination power Pdref. Note that the start determination power Pdref and the stop determination power Psref need not be defined based on the difference ΔSOC.

Figure 4:
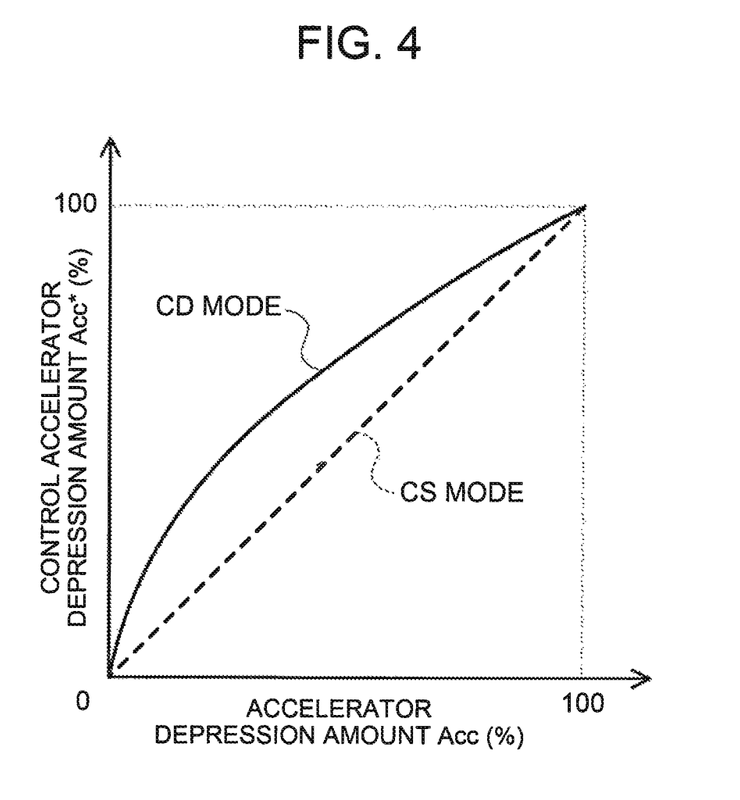
FIG. 4 is an explanatory diagram illustrating an example of a control accelerator depression amount setting map used in the hybrid vehicle in FIG. 1.

In addition, in the hybrid vehicle 1 according to the present embodiment, the power output characteristics of the power generation apparatus 20 can be changed depending on whether the traveling mode is the CD mode (EV traveling) or the CS mode (HV traveling). That is, in the hybrid vehicle 1, a control accelerator depression amount Acc* used, for example, to set the required torque Tr* is set based on the accelerator depression amount Acc detected by the accelerator pedal position sensor 83, and a control accelerator depression amount map used to set the control accelerator depression amount Acc* is changed depending on the traveling mode. As illustrated in FIG. 4, the control accelerator depression amount map is created in advance so as to define the relationship between the accelerator depression amount Acc and the control accelerator depression amount Acc*, and is stored in a ROM (not illustrated) of the HVECU 70.

As indicated by a solid line in FIG. 4, the control accelerator depression amount setting map for the CD mode is created such that the control accelerator depression amount Acc* is larger than the accelerator depression amount Acc by a larger amount as the accelerator depression amount Acc is smaller, and the control accelerator depression amount Acc* approaches the accelerator depression amount Acc as the accelerator depression amount Acc increases. That is, while the traveling mode is the CD mode, the control accelerator depression amount Acc* varies nonlinearly with respect to the accelerator depression amount Acc detected by the accelerator pedal position sensor 83. In contrast to this, as indicated by a broken line in FIG. 4, the control accelerator depression amount setting map for the CS mode is created such that the accelerator depression amount Acc detected by the accelerator pedal position sensor 83 is set, as it is, as the control accelerator depression amount Acc*.

Thus, while the traveling mode is the CD mode, the control accelerator depression amount Acc* is larger than the accelerator depression amount Acc (an amount by which the accelerator pedal 84 is depressed by the driver) detected by the accelerator pedal position sensor 83, whereby the required torque Tr* corresponding to the same vehicle speed becomes slightly higher than that while the traveling mode is the CD mode. Consequently, it is possible to improve the agility (zippy feeling) while the traveling mode is the CD mode, that is, while the hybrid vehicle 1 carries out EV traveling. The HVECU 70 sets the value of the output characteristic flag Fd to one when the control accelerator depression amount setting map for the CD mode should be used, whereas the HVECU 70 sets the value of the output characteristic flag Fd to zero when the control accelerator depression amount setting map for the CS mode should be used.

Further, in the present embodiment, a mode switch 88 (an example of "mode switching unit") is electrically connected to the HVECU 70. The mode switch 88 permits a driver to perform switching (selection) between the CD mode and the CS mode. Thus, the driver of the hybrid vehicle 1 can select a desired one of the CD mode and the CS mode as the traveling mode, by operating the mode switch 88. Basically, the HVECU 70 sets the value of the mode switch flag Fsw to one while the traveling mode is set to the CD mode, and sets the value of the mode switch flag Fsw to zero when the HVECU 70 determines that the driver has selected the CS mode based on a signal from the mode switch 88. Further, basically, the HVECU 70 sets the value of the mode switch flag Fsw to zero while the traveling mode is set to the CS mode, and sets the value of the mode switch flag Fsw to one when the HVECU 70 determines that the driver has selected the CD mode. Further, as illustrated in FIG. 1, the HVECU 70 is connected to a controller of a display device 90 including a traveling mode display unit configured to display the set traveling mode (the CD mode or the CS mode), and provides various kinds of display command signals to the controller.

Figure 5:
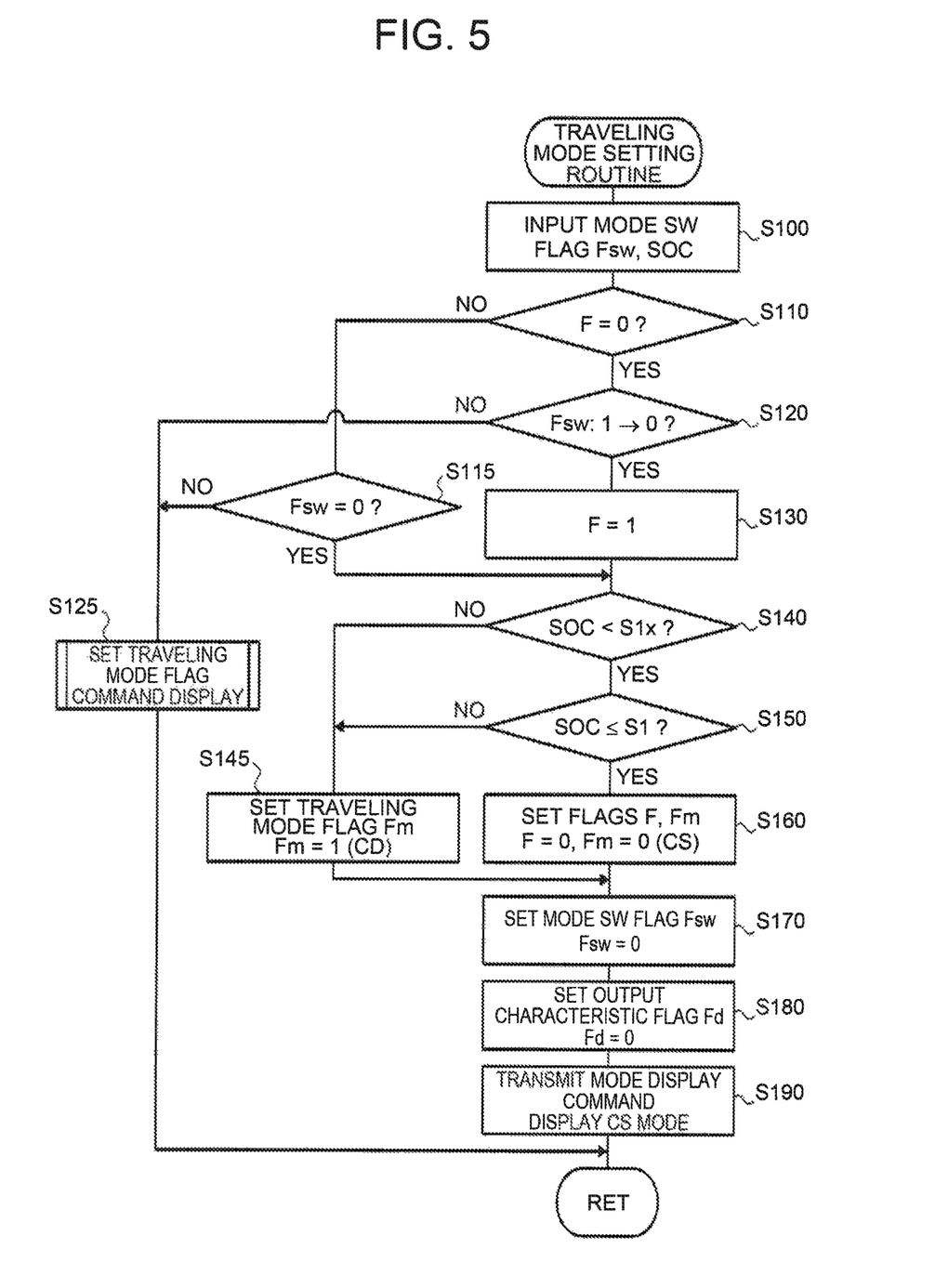
FIG. 5 is a flowchart illustrating an example of a traveling mode setting routine executed in the hybrid vehicle in FIG. 1.
Figure 6:
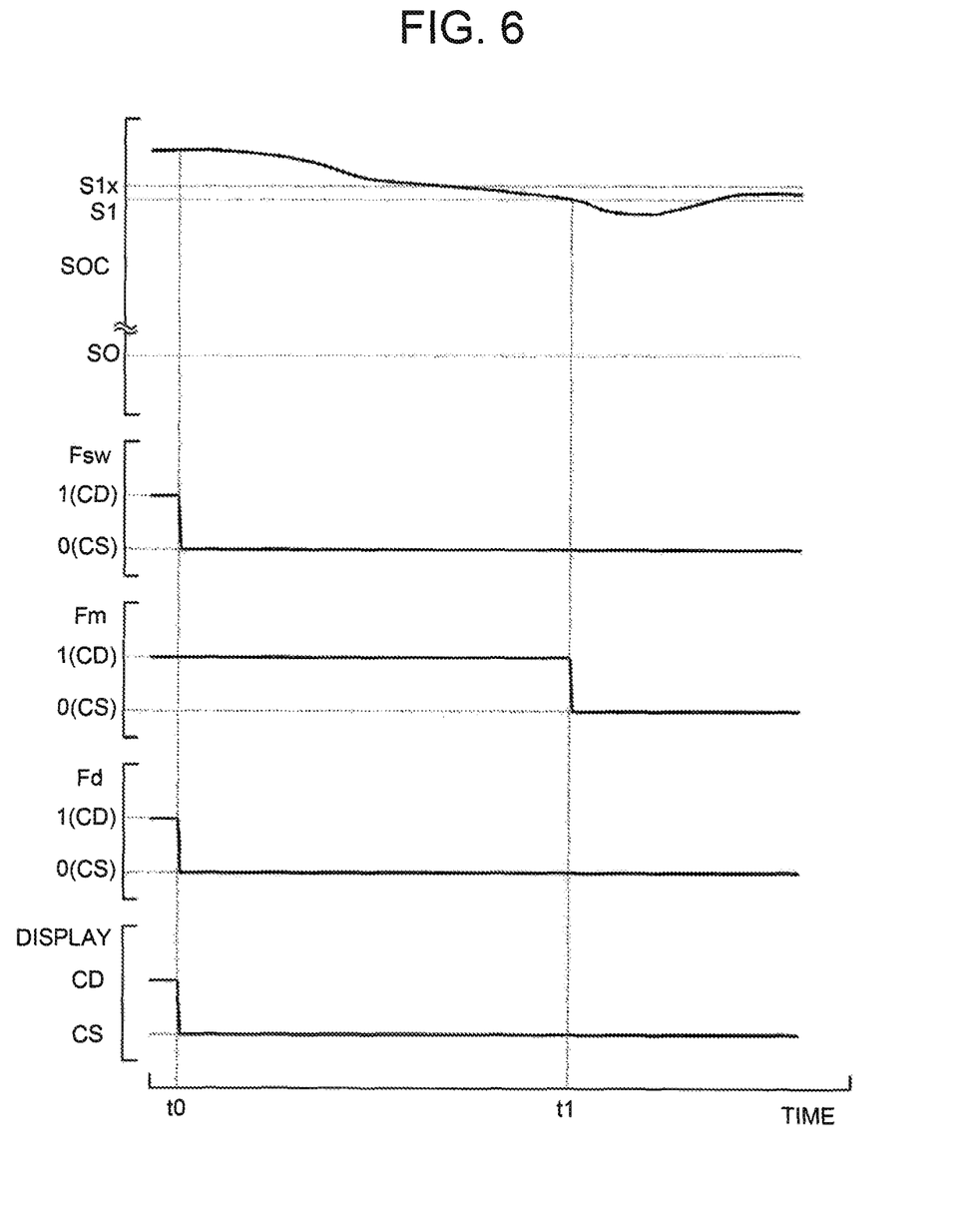
FIG. 6 is a time-series chart illustrating an example of temporal variation in each of an SOC of the electricity storage device, a mode switch flag value, a mode flag value, an output characteristic flag value, and traveling mode display, when the traveling mode is switched from the CD mode to the CS mode by a driver in the hybrid vehicle in FIG. 1.

Next, the procedure of setting the traveling mode of the hybrid vehicle 1 will be described with reference to FIG. 5 and FIG. 6. FIG. 5 is a flowchart illustrating an example of a traveling mode setting routine that is executed repeatedly at prescribed time intervals (every several milliseconds, for example) by the HVECU 70 while the system of the hybrid vehicle 1 is activated after the start switch 80 is turned on by a driver.

At the start of the routine in FIG. 5, the HVECU 70 (CPU) first receives data necessary for setting the traveling mode, such as a value of the mode switch flag Fsw and the SOC of the electricity storage device 40 from the power supply management ECU 45 (step S100). Then, the HVECU 70 determines whether or not the value of a prescribed flag F (initial value: zero) is zero (step S110). When the HVECU 70 determines that the value of the flag F is zero (step S110: YES), the HVECU 70 determines whether or not the value of the mode switch flag Fsw has been changed from one to zero, that is, whether or not the driver has operated the mode switch 88 to switch the traveling mode from the CD mode to the CS mode (step S120).

When the HVECU 70 determines in step S120 that the value of the mode switch flag Fsw has not been changed (step S120: NO), the HVECU 70 sets a mode corresponding to the SOC of the electricity storage device 40, from among the CD mode and the CS mode, as the traveling mode, and sets the value of the traveling mode flag Fm to one or zero (step S125). When the HVECU 70 determines in step S125 that the value of the mode switch flag Fsw has been changed from zero to one and that the traveling mode has been switched from the CS mode to the CD mode by the driver, the HVECU 70 sets the value of the traveling mode flag Fm to one if a prescribed transition condition for transition to the CD mode has been satisfied, whereas maintains the value of the traveling mode flag Fm at zero if the transition condition has not been satisfied. When the traveling mode is set to the CD mode in step S125, the HVECU 70 sets the value of the output characteristic flag to one, and transmits a command signal to the controller of the display device 90 to display the CD mode on the mode display unit. On the other hand, when the traveling mode is set to the CS mode in step S125, the HVECU 70 sets the value of the output characteristic flag to zero, and transmits a command signal to the controller of the display device 90 to display the CS mode on the mode display unit. After executing the process in step S125, the HVECU 70 ends the routine. Then, when the next execution timing comes, the HVECU 70 executes the process in step S100 and the subsequent processes again.

On the other hand, when the HVECU 70 determines in step S120 that the value of the mode switch flag Fsw has been changed from one to zero and that the traveling mode has been switched from the CD mode to the CS mode by the driver (step S120: YES), the HVECU 70 sets the value of the flag F to one (step S130). Then, the HVECU 70 determines whether or not the SOC received in step S100 is lower than a prescribed threshold S1x (step S140). The threshold S1x used in step S140 is a value slightly higher (for example, 82%) than the upper limit S1 of the control center value Scc of the SOC. Note that, the HVECU 70 may determine, in step S140, whether or not the SOC received in step S100 has exceeded the upper limit S1 of the control center value Scc.

When the HVECU 70 determines in step S140 that the SOC is equal to or higher than the threshold S1x and is higher than the upper limit S1 of the control center value Scc (step S140: NO), the HVECU 70 sets the value of the mode flag Fm to one (step S145). That is, while the traveling mode is the CD mode and the SOC of the electricity storage device 40 is higher than the upper limit S1 of the control center value Scc, even if the traveling mode is switched to the CS mode by the driver, the CD mode is set (maintained) as the traveling mode despite the fact that the driver has selected (desires) the CS mode.

After the process in step S145, the HVECU 70 sets the value of the mode switch flag Fsw to zero (step S170), and sets the value of the output characteristic flag Fd to zero (step S180). Thus, in control of the hybrid vehicle 1 (internally), even if the value of the mode flag Fm is set to one in order to set the traveling mode to the CD mode in step S145, the values of the mode switch flag Fsw and the output characteristic flag Fd are set to zero that corresponds to the mode selected by the driver, that is, the CS mode. Thus, the control accelerator depression amount Acc* coincides with the accelerator depression amount Acc detected by the accelerator pedal position sensor 83, and the power output characteristics of the power generation apparatus 20 coincide with those when the CS mode is set. The HVECU 70 then transmits a command signal to the controller of the display device 90 to display the CS mode on the mode display unit (step S190). Thus, even if the value of the mode flag Fm is set to one in order to set the traveling mode to the CD mode in step S145, the CS mode, which coincides with the mode selected by the driver, is displayed on the mode display unit of the display device 90.

After execution of the process in step S190, the HVECU 70 ends the routine. When the next execution timing comes, the HVECU 70 executes the process in step S100 and the subsequent processes again. Once the value of the flag F is set to one in step S130 as described above, a negative determination is made in step S110. In this case, the HVECU 70 skips the processes in step S120 and step S130, and determines whether or not the value of the mode switch flag Fsw is zero, that is, whether or not the driver maintains the selection of the CS mode (step S115). When the HVECU 70 determines in step S115 that the value of the mode switch flag Fsw is one and that the driver has operated the mode switch 88 to switch the traveling mode from the CS mode to the CD mode (step S115: NO), the HVECU 70 executes the process in step S125 and ends the routine.

On the other hand, when the HVECU 70 determines in step S115 that the value of the mode switch flag Fsw is zero and that the driver has not switched the traveling mode to the CD mode (step S115: YES), the HVECU 70 determines whether or not the SOC received in step S100 is lower than the threshold S1x (step S140). When the HVECU 70 determines that the SOC is equal to or higher than the threshold S1x (step S140: NO), the HVECU 70 executes the processes in steps S145 and S170 to S190, and ends the routine. On the other hand, when the HVECU 70 determines in step S140 that the SOC is lower than the threshold S1x (step S140: YES), the HVECU 70 determines whether or not the SOC received in step S100 is equal to or lower than the upper limit S1 of the control center value Scc (step S150). When the HVECU 70 determines that the SOC has exceeded the upper limit S1 (step S150: NO), the HVECU 70 sets (maintains) the value of the traveling mode flag Fm to one in order to maintain the traveling mode at the CD mode (step S145), and then executes the processes in steps S170 to S190 and ends the routine.

On the other hand, when the HVECU 70 determines in step S150 that the SOC is equal to or lower than the upper limit S1 (step S150: YES), the HVECU 70 sets (resets) the value of the flag F to zero, and sets the value of the mode flag Fm to zero in order to set the traveling mode to the CS mode (step S160). Thus, when the CD mode is set as the traveling mode although the traveling mode has been switched from the CD mode to the CS mode by the driver, the CS mode selected (desired) by the driver is set as the traveling mode at the time when the SOC becomes equal to or lower than the upper limit S1. After the process in step S160, the HVECU 70 executes the processes in steps S170 to S190, and ends the routine.

As a result of execution of the traveling mode setting routine in FIG. 5 as described above, in response to switching of the traveling mode from the CD mode to the CS mode performed by the driver while the SOC of the electricity storage device 40 is higher than the upper limit S1 of the control center value Scc (time to in FIG. 6), in control of the hybrid vehicle 1 (internally), the CD mode is set as the traveling mode despite the fact that the CS mode has been selected (desired) by the driver (step S145). Then, the CD mode is continuously set as the traveling mode until the SOC of the electricity storage device 40 becomes equal to or lower than the upper limit S1 of the control center value Scc (step S145). At the time when the SOC becomes equal to or lower than the upper limit S1 (time t1 in FIG. 6), the CS mode selected (desired) by the driver is set as the traveling mode (step S160).

Thus, when the driver switches the traveling mode to the CS mode while the traveling mode is the CD mode and the SOC of the electricity storage device 40 is higher than the upper limit S1 of the control center value Scc, it is determined whether or not to start up the engine 10 based on the start-up condition of the engine 10 in the CD mode, until the SOC of the electricity storage device 40 becomes equal to or lower than the upper limit S1 of the control center value Scc while the hybrid vehicle 1 is traveling. In this case, because the start determination power Pdref is set to a significantly large value (for example, infinite) as described above, start-up of the engine 10 based on the required traveling power Pd* required of the power generation apparatus 20 is substantially prohibited. Thus, when the driver switches the traveling mode from the CD mode to the CS mode while the SOC of the electricity storage device 40 is equal to or higher than the threshold S1*x* (step S140: NO), the power generation apparatus 20 (the engine 10, the motor generators MG1, MG2) is controlled by the HVECU 70 (and the engine ECU 15 and the MGECU 55) such that start-up of the engine 10 is restricted to a larger extent than when the driver switches the traveling mode from the CD mode to the CS mode while the SOC is equal to or lower than the upper limit S1 (step S140: YES, and step S150: YES).

As described above, by restricting start-up of the engine 10 in response to switching of the traveling mode from the CD mode to the CS mode performed by the driver while the SOC of the electricity storage device 40 is higher than the upper limit S1 of the control center value Scc, it is possible to significantly appropriately suppress the engine 10 from being started-up when the exhaust gas cleaning performance has been lowered due to a temperature drop of the exhaust gas catalyst 11*c*, by prolonging the interval of start-up of the engine 10. Further, by restricting start-up of the engine 10, it is possible to promote consumption of the electricity in the electricity storage device 40 to decrease the SOC, thereby protecting the electricity storage device 40 and relaxing the prohibition of regenerative braking. Consequently, the control of the hybrid vehicle 1 at the time when the driver switches the traveling mode from the CD mode to the CS mode can be made as effective as possible.

Further, by restricting start-up of the engine 10 from when the driver switches the traveling mode from the CD mode to the CS mode until when the SOC becomes equal to or lower than the upper limit S1 of the control center value Scc, even after the SOC becomes equal to or lower than the upper limit S1 of the control center value Scc, it is possible to respond to the driver's needs to maintain the SOC of the electricity storage device 40 at a high level by switching the traveling mode to the CS mode.

Further, by setting the traveling mode to the CL) mode in step S145 in FIG. 5, when the driver switches the traveling mode from the CD mode to the CS mode while the SOC is higher than the upper limit S1 of the control center value Scc, it is possible to restrict start-up of the engine W more appropriately based on the start-up condition of the engine 10 in the CD mode. Further, it is possible to suppress an increase in the design cost due to setting of a start determination condition dedicated to such switching of the traveling mode. In addition, by making a start determination on the engine 10 based on the start-up condition of the engine 10 in the CD mode, the difference ΔSOC between the SOC and the control center value Scc decreases with a decrease in the SOC. Thus, even when the target charging-discharging electricity Pb*, which is set based on the map in FIG. 2, increases toward the charging-side, it is possible to suppress the engine 10 from being started-up. Note that, a start determination on the engine 10 may be made based on a start determination condition dedicated to switching of the traveling mode, instead of setting the traveling mode to the CD mode from the time when a negative determination is made in step S140 in FIG. 5 until when an affirmative determination is made in step S150 in FIG. 5. In this case, a start determination power setting map dedicated to switching of the traveling mode may be a start determination power setting map having a larger start determination power corresponding to a combination of the same vehicle speed V and the same difference ΔSOC as those in the start determination power setting map illustrated in FIG. 3.

Further, in the hybrid vehicle 1, even if the CD mode is set as the traveling mode in response to switching of the traveling mode from the CL) mode to the CS mode performed by the driver while the SOC is higher than the upper limit S1 of the control center value Scc step S145), the CS mode is displayed on the traveling mode display unit (step S190). Thus, even if a start determination on the engine 10 is made based on the start-up condition of the engine 10 in the CD mode despite the fact that the driver has selected the CS mode, the driver is less likely to feel uncomfortable.

Further, in the hybrid vehicle 1, when the driver switches the traveling mode from the CD mode to the CS mode while the SOC is higher than the upper limit S1 of the control center value Scc, the value of the output characteristic flag Fd is set to zero (step S180), and the control accelerator depression amount setting map for the CS mode is used to set the required torque Tr*. That is, even when the CD mode is set as the traveling mode in step S145, the power output characteristics of the power generation apparatus 20 are changed to the power output characteristics in the CS mode. Thus, even when a start determination on the engine 10 is made based on the start-up condition of the engine 10 in the CD mode despite the fact that the CS mode has been selected by the driver, the driver is less likely to feel uncomfortable.

Note that the threshold used in step S140 in FIG. 5 is not limited to the threshold S1*x* that is higher than the upper limit S1 of the control center value Scc of the SOC. The threshold used in step S150 in FIG. 5 is not limited to the upper limit S1. That is, step S140 in FIG. 5 may be a step for determining whether or not the SOC of the electricity storage device 40 is within a prescribed high SOC range. Step S150 in FIG. 5 may be a step for determining whether or not the SOC is within a lower SOC range that is on the lower side of the high SOC range. Further, the hybrid vehicle 1 may include a transmission mechanism (stepped transmission) provided between the drive shaft 35 and the differential gear 39. Further, the hybrid vehicle 1 may be a non-plug-in hybrid vehicle, as long as the traveling mode can be set to either the CD mode or the CS mode. Further, instead of the mode switch 88, a mode switching unit that permits the driver to perform switching (selection) between the CD mode and the CS mode may be provided on the screen of the display device 90.

Figure 7:
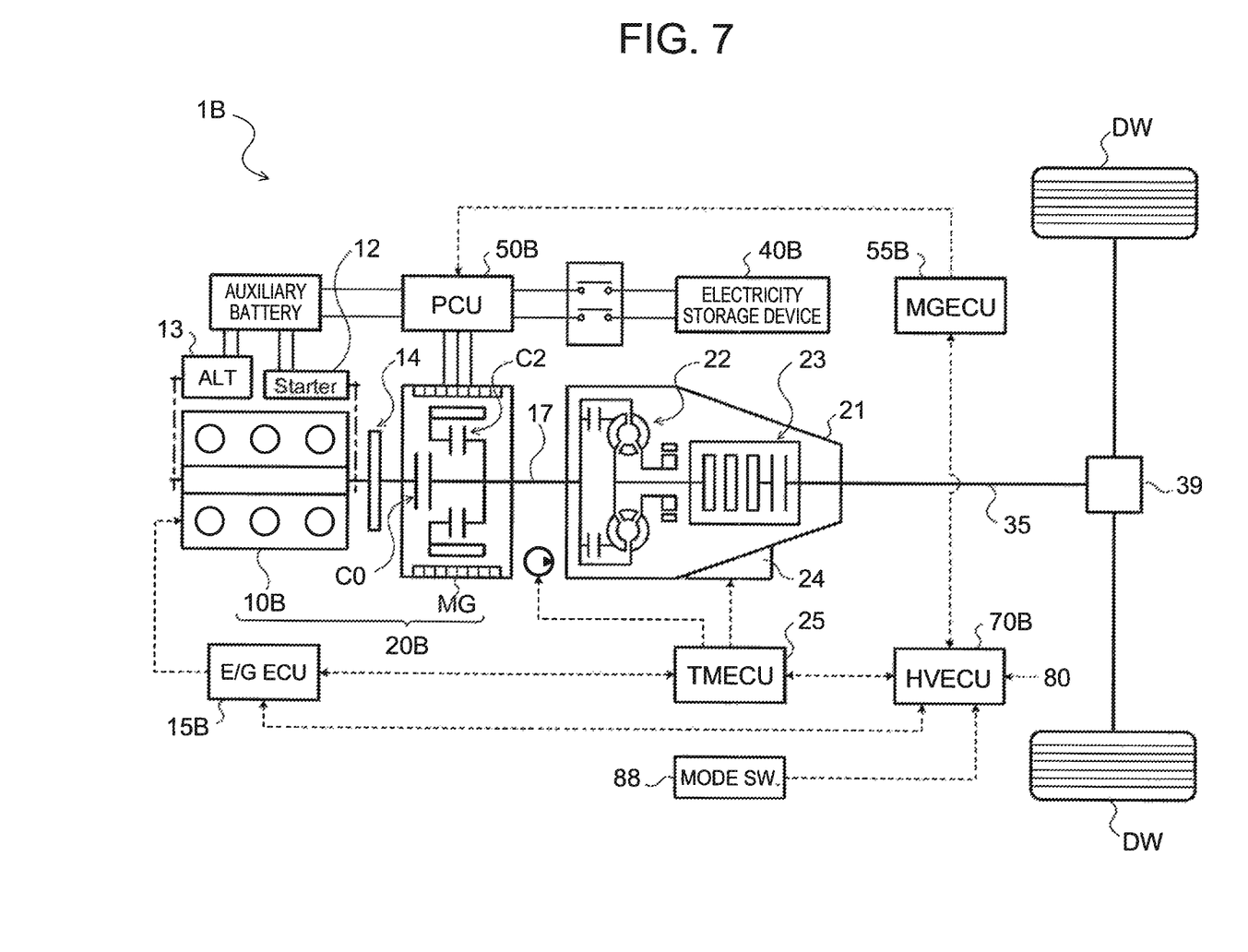
FIG. 7 is a diagram schematically illustrating the configuration of another hybrid vehicle according to the disclosure.

FIG. 7 is a diagram schematically illustrating the configuration of another hybrid vehicle 1B according to the disclosure. The hybrid vehicle 1B illustrated in FIG. 7 is a parallel hybrid vehicle including a power generation apparatus 20B that includes an engine 10B and a motor venerator MG, a power transmission device 21, and a HVECU 70B serving as a controller that controls the entirety of the hybrid vehicle 1B.

The engine 10B is an internal combustion engine controlled by an engine ECU 15B, and is provided with an exhaust gas catalyst (not illustrated), a starter 12, an alternator 13 that is driven by the engine 10B to generate electricity, and so forth. The motor generator MG is a synchronous generator-motor configured to supply electricity to an electricity storage device 40B via a PCU 50B controlled by an MGECU 55B and to be supplied with electricity from the electricity storage device 40B via the PCU 50B. The motor generator MG is configured to generate electricity with the use of at least part of the power from the engine 10B. The power generation apparatus 20B includes, in addition to the engine 1011 and the motor generator MG, a normally-disengaged clutch C0 (first clutch) configured to connect a crankshaft of the engine 10B and a transmission shaft 17 to each other via a flywheel damper 14 and to disconnect the crankshaft of the engine 10B and the transmission shaft 17 from each other, and a normally-engaged clutch C2 (second clutch) configured to connect a rotor of the motor generator MG and the transmission shaft 17 to each other and to disconnect the rotor of the motor generator MG and the transmission shaft 17 from each other.

The power transmission device 21 includes a starting device 22 that includes a lock-up clutch, a torque converter (hydraulic power transmission), a damper device (not illustrated) and so forth, a mechanical oil pump, a transmission mechanism (automatic transmission) 23, a hydraulic control device 24 and so forth. The transmission mechanism 23 is a transmission having four to ten speeds and including a plurality of planetary gear mechanisms, and a plurality of clutches (frictional engagement elements) and a plurality of brakes (frictional engagement elements). The transmission mechanism 23 is configured to change the speed of rotation transmitted from the transmission shaft 17 via the starting device 22 based on a speed ratio selected from a plurality of speed ratios, and to output the rotation with a changed speed to the drive shaft 35 serving as an output shaft. The hydraulic control device 24 is controlled by a transmission electronic control unit (hereinafter, referred to as "TMECU) 25 including a microcomputer that includes a CPU and so forth (not illustrated). The hydraulic control device 24 regulates the hydraulic pressure from a mechanical oil pump or an electric oil pump and supplies the regulated hydraulic pressure to the lock-up clutch and the clutches and the brakes of the transmission mechanism 23. The hydraulic pressure from the hydraulic control device 24 is also supplied to the clutches C0, C2 of the power generation apparatus 20B. The clutches C0, C2 are controlled by the TMECU 25 based on a command signal from the HVECU 70B.

The hybrid vehicle 1B configured as described above starts traveling with the use of the power from the motor generator MG in a state where the clutch C0 is disengaged and the clutch C2 is engaged, after the system is activated. In the hybrid vehicle 1B as well, when the SOC of the electricity storage device 40B has exceeded a prescribed first threshold Sref1 at the time of activation of the system, the HVECU 70B sets the traveling mode to the CD mode. Further, when the SOC of the electricity storage device 40B becomes equal to or lower than a second threshold Sref2 that is lower than the first threshold Sref1 while the hybrid vehicle 1B is traveling in the CD mode, the HVECU 70B switches the traveling mode from the CD mode to the CS mode. Further, in the hybrid vehicle 1B as well, a mode switch (an example of a mode switching unit) 88 that permits a driver to perform switching (selection) between the CD mode and the CS mode is electrically connected to the HVECU 70B. The HVECU 70B executes a routine to set the traveling mode in the same manner as the traveling mode setting routine in FIG. 5. Thus, in the hybrid vehicle 1B as well, it is possible to produce the same advantageous effects as those in the hybrid vehicle 1.

Note that the hybrid vehicle 1B may be a plug-in hybrid vehicle configured such that the electricity storage device 40B can be charged with electricity from an external power source. The hybrid vehicle 1B may be a four-wheel-drive vehicle configured such that the power output to the drive shaft 35 is distributed to the front wheels and the rear wheels by a transfer (not illustrated).

As described above, the hybrid vehicle 1 (1B) according to the disclosure includes the power generation apparatus 20 (20B) that includes the engine 10 (10B) provided with the exhaust gas catalyst 11c (the exhaust gas catalyst) and the motor generators MG1, MG2 (the motor generator MG) configured to generate electricity with the use of at least part of the power from the engine 10 (10B), and the electricity storage device 40 (40B) configured to supply electricity to the motor generators MG1, MG2 (the motor generator MG) and to be supplied with electricity from the motor generators MG1, MG2 (the motor generator MG). In the hybrid vehicle 1 (1B), one of the CD mode and the CS mode can be selectively set as the traveling mode. The hybrid vehicle 1 (1B) includes the mode switch 88, which is an example of a mode switching unit that permits a driver to perform switching between the CD mode and the CS mode, and the HVECU 70 (70B) serving as a control device. The HVECU 70 (70B) controls the power generation apparatus 20 (20B) such that, when the driver switches the traveling mode from the CD mode to the CS mode while the SOC of the electricity storage device 40 (40B) is higher than the upper limit S1 of the control center value Scc in the CS mode, start-up of the engine 10 (10B) is restricted to a larger extent than when the driver switches the traveling mode from the CD mode to the CS mode while the SOC is equal to or lower than the upper limit S1. Consequently, the control of the hybrid vehicle 1 (1B) at the time when the driver switches the traveling mode from the CD mode to the CS mode can be made as effective as possible. Note that the hybrid vehicle according to the disclosure may be a series hybrid vehicle.

Further, the disclosure is not limited to the foregoing embodiments. It is needless to say that various modifications may be made within the scope of the disclosure. Further, each of the foregoing embodiments is merely an example of the disclosure, and does not limit the elements of the disclosure.

The disclosure is applicable to, for example, the hybrid vehicle manufacturing industry.

What is claimed is:

1. A hybrid vehicle configured such that one of a charge-depleting mode and a charge-sustaining mode is selectively set as a traveling mode, the hybrid vehicle comprising:
a power generation apparatus including
an engine provided with an exhaust gas catalyst, and
an electric motor configured to generate electricity with use of at least part of power from the engine;
an electricity storage device configured to supply electricity to the electric motor or to be supplied with electricity from the electric motor;
a mode switching unit configured to permit a driver to perform switching between the charge-depleting mode and the charge-sustaining mode; and
an electronic control unit configured to
control the power generation apparatus such that a state of charge of the electricity storage device approaches a control center value that is equal to or lower than an upper limit set in advance, while the traveling mode is the charge-sustaining mode, and
control the power generation apparatus such that start-up of the engine is restricted to a larger extent when the driver switches the traveling mode from the charge-depleting mode to the charge-sustaining mode while the state of charge is higher than the upper limit of the control center value, than when the driver switches the traveling mode from the charge-depleting mode to the charge-sustaining mode while the state of charge is equal to or lower than the upper limit of the control center value.

2. The hybrid vehicle according to claim 1, wherein the electronic control unit is configured to restrict start-up of the engine from when the driver switches the traveling mode to the charge-sustaining mode until when the state of charge becomes equal to or lower than the upper limit of the control center value.

3. The hybrid vehicle according to claim 1, wherein the electronic control unit is configured to determine whether or not to start up the engine based on a start-up condition of the engine in the charge-depleting mode, when the driver switches the traveling mode from the charge-depleting mode to the charge-sustaining mode while the state of charge is higher than the upper limit of the control center value.

4. The hybrid vehicle according to claim 3, further comprising a traveling mode display unit configured to display the traveling mode that is one of the charge-depleting mode and the charge-sustaining mode, wherein
the electronic control unit is configured to display the charge-depleting mode on the traveling mode display unit in response to switching of the traveling mode from the charge-depleting mode to the charge-sustaining mode performed by the driver while the state of charge is higher than the upper limit of the control center value.

5. The hybrid vehicle according to claim 3, wherein
the electronic control unit is configured to:
change a power output characteristic of the power generation apparatus depending on whether the traveling mode is the charge-depleting mode or the charge-sustaining mode; and
change the power output characteristic of the power generation apparatus to a power output characteristic in the charge-sustaining mode, when the driver switches the traveling mode from the charge-depleting mode to the charge-sustaining mode while the state of charge is higher than the upper limit of the control center value.

6. The hybrid vehicle according to claim 1, wherein the electronic control unit is configured to prohibit start-up of the engine at least based on a required traveling power required of the power generation apparatus, in response to switching of the traveling mode from the charge-depleting mode to the charge-sustaining mode performed by the driver while the state of charge is higher than the upper limit of the control center value.

7. The hybrid vehicle according to claim 1, wherein the electricity storage device is configured to be charged with electricity from an external power source.

8. A method of controlling a hybrid vehicle configured such that one of a charge-depleting mode and a charge-sustaining mode is selectively set s a traveling mode,
the hybrid vehicle including:
a power generation apparatus including
an engine provided with an exhaust gas catalyst, and
an electric motor configured to generate electricity with use of at least part of power from the engine; and
an electricity storage device configured to supply electricity to the electric motor or to be supplied with electricity from the electric motor,
the hybrid vehicle being configured such that a driver is permitted to perform switching between the charge-depleting mode and the charge-sustaining mode,
the method comprising restricting start-up of the engine to a larger extent when the driver switches the traveling mode from the charge-depleting mode to the charge-sustaining mode while a state of charge of the electricity storage device is higher than an upper limit of a control center value of the state-of charge in the charge-sustaining mode, than when the driver switches the traveling mode from the charge-depleting mode to the charge-sustaining mode while the state of charge is equal to or lower than the upper limit of the control center value.

* * * * *